(12) United States Patent
Cohn et al.

(10) Patent No.: US 10,992,960 B2
(45) Date of Patent: Apr. 27, 2021

(54) ACCELERATED VIDEO EXPORTATION TO MULTIPLE DESTINATIONS

(71) Applicants: Jared Michael Cohn, Sherman Oaks, CA (US); Alexander Osborne, New York, NY (US)

(72) Inventors: Jared Michael Cohn, Sherman Oaks, CA (US); Alexander Osborne, New York, NY (US)

( * ) Notice: Subject to any disclaimer, the term of this patent is extended or adjusted under 35 U.S.C. 154(b) by 2 days.

(21) Appl. No.: 16/269,527

(22) Filed: Feb. 6, 2019

(65) Prior Publication Data

US 2020/0252651 A1  Aug. 6, 2020

(51) Int. Cl.
| | |
|---|---|
| *H04N 19/174* | (2014.01) |
| *H04N 21/2347* | (2011.01) |
| *H04N 21/234* | (2011.01) |
| *H04N 19/625* | (2014.01) |
| *H04N 19/159* | (2014.01) |
| *H04N 19/547* | (2014.01) |
| *H04N 19/172* | (2014.01) |
| H04N 21/854 | (2011.01) |
| G06F 16/00 | (2019.01) |

(52) U.S. Cl.
CPC ......... *H04N 19/625* (2014.11); *H04N 19/159* (2014.11); *H04N 19/172* (2014.11); *H04N 19/174* (2014.11); *H04N 19/547* (2014.11)

(58) Field of Classification Search
CPC .. H04N 19/625; H04N 19/159; H04N 19/172; H04N 19/174; H04N 19/547; H04N 21/44012; H04N 21/2347; H04N 21/4408; H04N 21/85406; G06T 15/00; G06T 15/205; G06F 5/00; G06F 16/116; G06F 16/1794; G06F 3/048; H04L 41/22
USPC ....................................................... 375/240.2
See application file for complete search history.

(56) References Cited

U.S. PATENT DOCUMENTS

| | | | |
|---|---|---|---|
| 2005/0271358 A1* | 12/2005 | Inata .................... | H04N 9/8042 386/232 |
| 2006/0177114 A1* | 8/2006 | Tongdee ................. | G06F 16/58 382/128 |
| 2007/0180131 A1* | 8/2007 | Goldstein ........... | H04L 67/1068 709/230 |
| 2008/0013916 A1* | 1/2008 | Sharpe ................. | G11B 27/034 386/278 |
| 2010/0149304 A1* | 6/2010 | Chao .................. | H04N 7/17309 348/14.08 |

(Continued)

*Primary Examiner* — Christopher S Kelley
*Assistant Examiner* — Kathleen M Walsh

(57) ABSTRACT

Systems and methods described herein provide a new mechanism of video exportation which ensures that the process is done faster and that a single video can be exported to two or more destination at the same time. This document explains the steps involved in the creation of the video, processes involved in encoding, rendering, transmission/exportation, and playing the video. Figures are used in explaining or illustrating the flow of processes and showing the different devices used in accomplishing various activities in the exporting processes. The application will receive commands to perform the exporting from the destination. Overall, the application will be able to facilitate faster exportation of a video, almost twice the basic speed of the known video exportation systems and to multiple destinations unlike in exportation by the basic applications in use today.

20 Claims, 8 Drawing Sheets

(56) References Cited

U.S. PATENT DOCUMENTS

| | | | |
|---|---|---|---|
| 2011/0026898 A1* | 2/2011 | Lussier | G06F 3/04842 |
| | | | 386/280 |
| 2012/0275758 A1* | 11/2012 | Tsuji | H04N 21/4325 |
| | | | 386/230 |
| 2014/0331262 A1* | 11/2014 | Tam | H04N 21/234309 |
| | | | 725/61 |
| 2016/0105530 A1* | 4/2016 | Shribman | H04L 67/06 |
| | | | 709/218 |
| 2017/0011768 A1* | 1/2017 | Cho | G11B 20/0021 |
| 2017/0070760 A1* | 3/2017 | Marshall | H04N 21/6547 |
| 2017/0076572 A1* | 3/2017 | Rao | H04N 5/91 |
| 2017/0237796 A1* | 8/2017 | Zimmerl | H04N 21/4402 |
| | | | 709/231 |
| 2017/0256288 A1* | 9/2017 | Ai | H04N 5/7605 |
| 2017/0353748 A1* | 12/2017 | Van Dusen | H04N 21/2402 |
| 2018/0218073 A1* | 8/2018 | Wilshinsky | G06F 21/6209 |
| 2018/0220189 A1* | 8/2018 | Hodge | G06K 19/06009 |
| 2019/0200056 A1* | 6/2019 | Van Dusen | H04N 21/4858 |

* cited by examiner

ACCELERATED VIDEO EXPORTATION TO MULTIPLE DESTINATIONS

LIST OF REFERENCES

| US PATENT DOCUMENTS | | |
|---|---|---|
| 7,769,819 B2 | Aug. 3, 2010 | Lerman et al. |
| 8,687,697 B2 | Apr. 1, 2014 | Srinivasan et al. |
| 8,379,722 B2 | Feb. 19, 2013 | Tourapis et al. |
| 6,882,685 B2 | Apr. 19, 2005 | Marvar |
| 2007/0016405 A1 | Jan. 18, 2007 | Mehrotra et al. |
| 8,488,670 B2 | Jul. 16, 2013 | Demos et al. |
| 8,189,666 B2 | May 29, 2012 | Wu et al. |
| 7,408,990 B2 | Aug. 5, 2008 | Lin et al. |
| 7,599,438 B2 | Oct. 6, 2009 | Holcomb et al. |
| 6,968,005B2 | Nov. 22, 2015 | Hannuksela |
| 9,426,495 B2 | Aug. 23, 2016 | Sullivan |
| 2007/01600133 A1 | Jul. 12, 2007 | Bao et al. |
| 8,837,600 B2 | Sep. 16, 2014 | Sullivan |
| 7,065,139 | Jun. 20, 2006 | Park et al. |
| 2012/0051434 A1 | Mar. 1, 2012 | Blum |
| 2015/0365693 | Dec. 17, 2015 | Johar et al. |
| 8,374,242 B1 | Feb. 12, 2013 | Lewis et al. |
| 9,432,723 B2 | Aug. 30, 2016 | Luthra |
| 2011/0109758 A1 | May 12, 2011 | Liang et al. |
| 5,579,239 A | Nov. 26, 1996 | Freeman et al. |
| 6,711,622 B1 | Mar. 23, 2004 | Fuller et al. |
| 9,736,200 B2 | Aug. 15, 2017 | Addy et al. |
| FOREIGN PATENT DOCUMENTS | | |
| 1,294198 B1 | Nov. 16, 2016 | Jie Liang et al. |

FIELD OF THE INVENTION

The present disclosure is in the field of processing video content. More particularly, the present disclosure provides systems and method accelerating exportation of video content to multiple destinations.

BACKGROUND

Technological advancement has resulted in advancement in photography and video creation. Videos have greatly increased in resolution, quality, and size. A 3-minute video can be of up to a size of 300 Mb (megabytes). Exporting such videos takes a considerable amount of time, and therefore, one objective that technology seeks to achieve—speed—fails automatically. There has been a great increase in the need for exchange of videos among video editing and video playing applications, which they require the exporting feature. Also, there has not been introduced or invented any framework that can facilitate sharing of videos to multiple destinations. With the need for exporting a video at a faster speed and to multiple destinations simultaneously, the patent disclosure introduces an innovative idea or framework that can facilitate sharing of videos at a faster speed and to multiple destinations.

SUMMARY

FIG. 1 presents a combination of tools and flow of processes along with the exchange of files, data, and information used in facilitating faster exportation of videos to multiple destinations. Three concepts are implemented at this juncture in addition to the normal processes that video exportation follows. One of the concepts is to replicate a video into two copies. This can be explained using simpler terms as copying and pasting, only that in this case creation of the copy is done automatically as part of the overall exporting process. After replication, the videos are sliced into smaller portions. Slicing is the major technique that allows this framework to be faster than others. Thirdly, a network is implemented to facilitate transmission of the slices. Before the video is replicated, however, it is compressed and encoded. The replica carries the encoding address with them. Even after slicing, and converting the files into packets for transmission over the network, after merging, the initial encoding key is restored or reformed. Upon being reformed, decoding and decompression are done in the destination by this application disclosure.

The art of slicing the videos will ease the load, which will make it easy for slices to be transmitted faster via the network faster. Transmitting a large file takes longer than transmitting smaller videos. Also, a file is transmitted through a single channel. So, when many files are being transmitted, a transmission channel is created for each. Since larger files take longer to be transmitted when compared to smaller files, this patent disclosure will slice a file into multiple slices that will be smaller. The smaller slices will, therefore, be transmitted faster through their independent channels. This patent application will optimize the transmission channel to allow it to support the transmission of all slices without facing obstacles.

DETAILED DESCRIPTION

In the patent disclosure, things involved in exporting a video is looked into. This included the user who seeks to export a video, and who might have created or outsourced the video, computing and networking hardware used, the external applications used and the processes involved. This patent, however, does not focus on video creation; videos can be sourced from anywhere. But it will manipulate the file in various ways to facilitate its exportation. These are illustrated in diagrammatic overview where interrelated diagrams are developed to show how the whole system will work in facilitating faster exporting of videos to multiple destinations.

Figure 1:
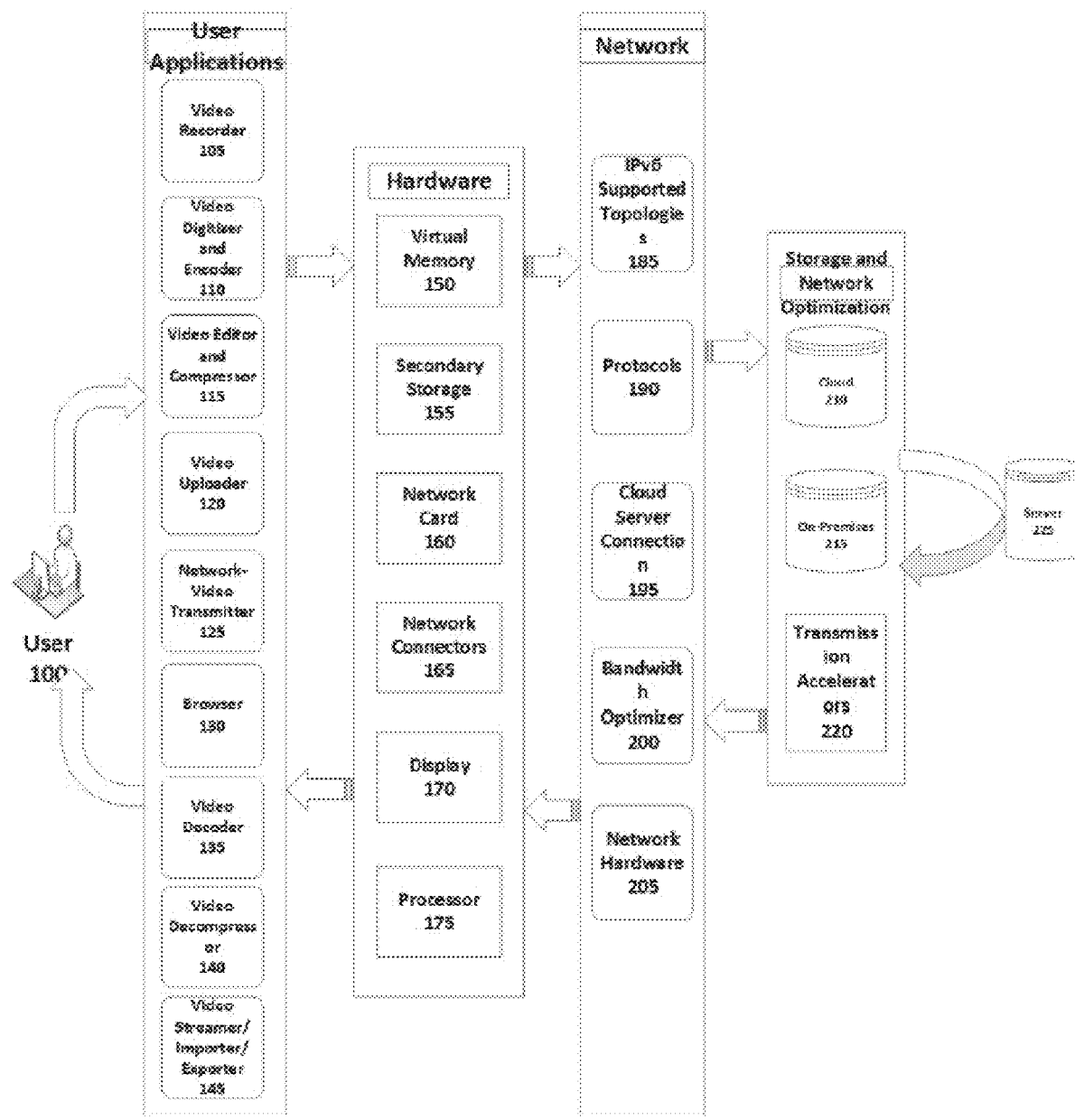
FIG. 1 shows the processes involved and the entities required in facilitating video exporting.

FIG. 1: User 100 is the one responsible for exporting and is presumed to be in possession of a video, which may be borrowed from a different source. The video source has various limited responsibilities while compared to the other user. The source provides the video, which can be directly recorded, created using software, outsources from an online database and other libraries. For instance, YouTube is one of the most resourceful sources of videos, and Netflix is an example of a good source of large High Definition (HD) films and television shows. Other sources include archives such as the British Pathe Film Archive of 1896-1976, internet archives, and other historical archives. Presumably, obtaining a video might not be an issue, but one may find themselves taking a considerable amount of time to get the video due to the low speed of transmission between databases or storage spaces.

Indeed, there are numerous websites, cloud-based applications, other software in distributed networks, and others on stand-alone desktop applications which contain or can house videos. But, for the sake of improved accessibility and flexibility, and the sake of the future, exporting videos on the cloud is more focused on. Thus, it is presumed in FIG. 1 that server 225 is on the cloud as well as cloud storage 210. However, to determine efficiency in exportation, a comparison is made between different storage servers. Nonetheless, transmission accelerator 220 is implemented and serves application regardless of whether they are based in the cloud or on premises. The accelerator works through choosing the best packet routing and bandwidth allocation strategy to created slices of the video. This, however, is not managed by the user since it is a backend functionality, which is more of a network configuration that does not require being set up time and again.

The figure also illustrates various applications or software involved. One basic software is a browser. The application layer of a network, as discussed later in FIG. 6, requires the use of applications such as a browser to perform various essential tasks associated with the display of content. The application layer allows the user to manage the network, which is only accessible through a browser. Through it, the protocols to implement, which is IPv6, is set. Also, a file transfer protocol (FTP) is set along with other protocols that allow the user to manage the network as they transmit packets. The other protocols include the Simple Network Management Protocol (SNMP), the Common Management Information Protocol over TCP (COMT), and email management using the Simple Mail Transfer Protocol (SMTP). SMTP, however, is not very much focused on since it is not part of the protocols that are essentially required at this juncture. Trivial File Transfer Protocol (TFTP) is another very essential protocol to implement, however. Also, some concepts are borrowed from the protocols or systems that are supported by TCP/IP and have shown great success in video files transfer and transfer of other large files.

Hardware is an essential part and a great determinant of the success of this application disclosure. Typically, it is mandatory for the computer to have input and output devices with inputs being a mouse, keyboard, microphones, buttons, and others while output devices being the monitor for display and speakers for voice. However, some specifications as indicated earlier are essential. One of the essential is virtual memory 150 to be of considerable size since it is a great determinant of the performance of a computer. It should be of a large capacity and more importantly, developed by legit manufacturers using genuine and legit technology to allow for efficient and effective functionality with low chances of the data breaking down. The secondary storage 155 is also required. Secondary storage as indicated earlier may be physical or on the cloud. But, for smooth functionality and usage of the computer by the user, installed hard drive is an essential requirement since it is presumed that a user has to save the video on their computers before transmitting it. But some computers entirely work from a network, and they run applications that are on the server. In such a case, a powerful network interface card (NIC) is required. The network card allows for wireless peer-to-peer (P2P) connection, connection through ethernet, wireless connection, through Wi-Fi for instance, and connection via other networking technologies. NIC facilitates Different LAN connections, which may be essential. Thus, one essential away of exporting a video from a computer to another is through creating a P2P connection between the computers and then conducting the transfer. But even P2P connection can be facilitated through the cloud especially in computers that are not in one another's range.

Figure 6:
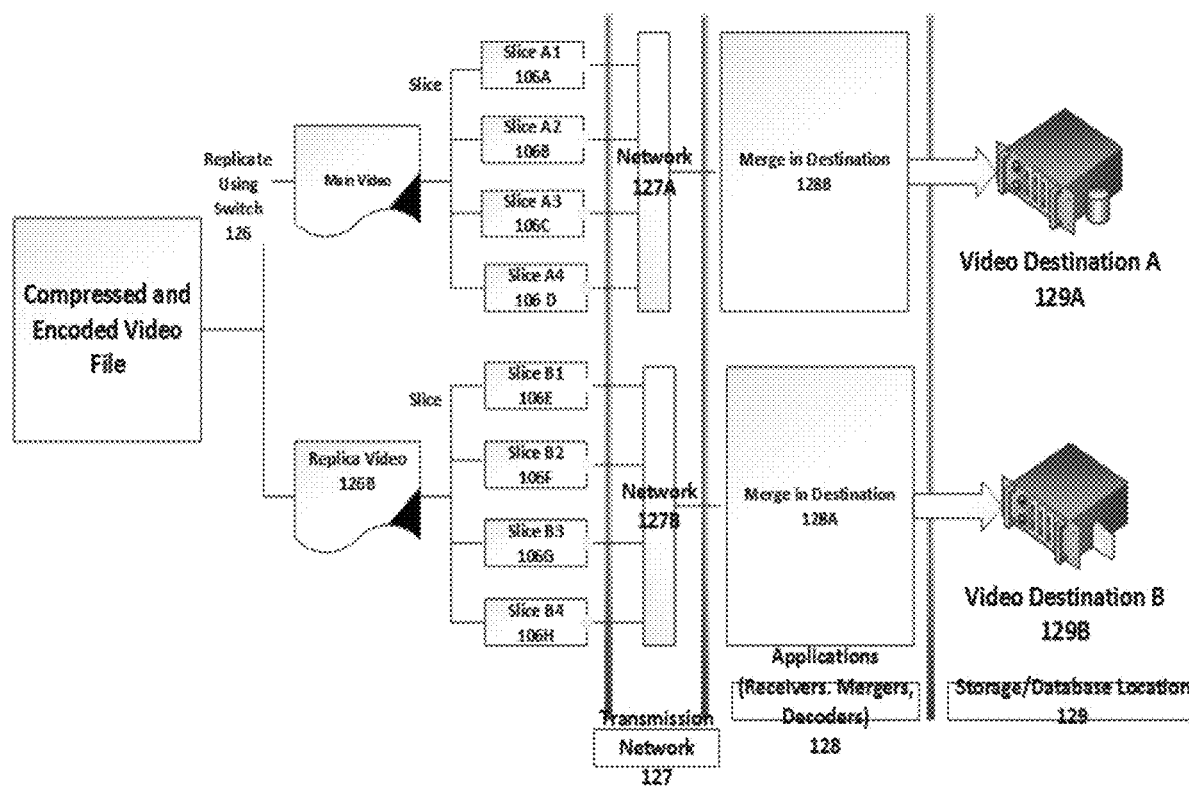
FIG. 6 illustrates the activities involved in accelerating the network and allowing it to transmit the video packets fast and efficiently, to their export destination.

Network Connectors 165 is further illustrated in FIG. 6, being used as connectors for Network 127A and Network 127B. In particular, the link used here is the ethernet. But this is a representation of the connection. In a real sense, the connection can be conducted via numerous nodes. The nodes of connection that can be conducted on Network 127A and Network 127B include Local Area Network (LAN), which implements the ethernet. Preferably, a minimum of CAT 6 cables is recommended for use—while compared to CAT 5 cables, CAT 6 provides greater bandwidth and speed. In looking at the particular specifications of CAT 6 cables, thy support Gigabit Ethernet requirements, and frequencies of up to 250 MHz along with up to 10GBASE-T standards. Besides, the cables can stretch to up to 100 meters without signal attenuation. CAT 6e and CAT 7 cables are also recommendable since they have advanced features beyond those of CAT 6 cables. Virtual LAN (VLAN) network architecture can be used as well as the Wireless LAN (WLAN). A good example of WLAN is the Wi-Fi, also known as Wireless LAN (WLAN) or the network standard 802.11a/b/g/n/ac. It is also fast but has limited functionality which is caused by the inability to reach top speed, the inability for the Wi-Fi access point or router to broadcast signals at a wide range, and the aspect of interference, insecurity, and obstruction of the signal by physical barriers such as walls, wind, and others. Virtual Private Network (VPN is also a good choice for interconnecting user 100 to Network 127A and Network 127B.

Cloud connection poses a slightly different case of networking. It requires a broadband internet connection to achieve mobility and high-speed at the same time. Cloud server connection 195, therefore, requires special considerations. One of the special considerations that it requires is the implementation of the Cloud Private Network Connection (CPNC). Cloud computing, however, comes with other demands such as the mandatory use of a browser, implementation of the cloud management system (CMS), the aspect of training for one to become familiar with them. Even if the major concept in the patent disclosure is to ensure that the video is compressed, encoded, and exported fast, and to two destinations simultaneously, transmission lines to be used along with the mode of connection to implement have much to do with the success of the major concepts. Technically, the cloud server connection will provide storage space for the video, and it can also be running an application that requires the video to be transmitted into. Therefore, a user through the cloud can import or export a video from anywhere. Also, the exporting process can be carried out collaboratively.

However, the cloud connection 195 has to be accessed privately to avoid the busy public bandwidth and to produce security. This can efficiently implement the private intra-cloud networking. Ensuring that the private network becomes an intra-cloud network is very important and is considered complex as well. It is considered important to purchase cloud service packages from vendors such as the Amazon Web Services (AWS).

Technically, irrespective of network architecture or type, bandwidth considerations are important. One has to consider choosing a large bandwidth, especially when dealing with large videos. The bandwidth optimization 200 modules are implemented in ensuring that the bandwidth remains optimized, providing the flawless exchange of video packets from the source application as they get exported to the destination. One tactic that is implementable in bandwidth optimization is compression of the data in the encoding and rendering processes to avoid redundancy in the source video file. Secondly, duplication is another essential method to implement in optimizing the bandwidth. Other techniques include object caching, traffic shaping, and rectification of forwarding error. The bandwidth optimizer 200 will make use of various networking protocols such as the Dynamic Host Configuration Protocol (DHCP), which is easy to configure as far as virtual networks are concerned. Since it works best on DNS supported networks, the network setup will adhere to DNS configuration properties, even in the application layer level. Therefore, selection of protocols 190 will have to be included in this case. The selection, however, has to take consideration of the different servers the video is exported to as there is the cloud 195 and 210 as well as on on-premises destination on 215.

Upon looking back to the hardware requirements that both users 100 need to be using, they need display units. Applications are implemented in these sections too. The roles of the applications will be to merge the packets into a single entity and then decrypt an decompress the video so that is can be playable. Thus, encoding or transcoding and rendering as indicated before are crucial steps that cannot be omitted as far as faster exporting has to be achieved. Considerably, the application-based functionalities may not greatly change since the most software are developed with standard exporting functionalities. This patent disclosure has to be implemented as an independent system that can be integrated into other systems or be used as a stand-alone system. But, using it as a stand-alone system would limit its ability to work efficiently. Technically, the patent disclosure gives a way through which the exportation can be done more efficiently. For instance, earlier implementations have various processes through which a user can make exporting faster. But this exporting can only be done locally—on the same computer, and the same local drive. The basic processes of encoding and rendering are considered in this case too, however, but they can be borrowed for use in other systems.

The browser 130 is used in not only displaying the applications that are run on the cloud, but it will also help in showing the rendered video after its creation. Digital video recorders, however, can also be in a position to carry out the rendering process. After browsing the videos to export or to use imported ones, the user needs to use video decoder 135, a video decompressor 140, and video streamer or player 145. These entities help in ensuring that the patent disclosure is complete, conducting the exporting and tasks and ensuring that the individuals form the receiving end have access to the files. This will ensure that the data transmitted travels from source to destination and that after export, the file is usable.

Figure 2:
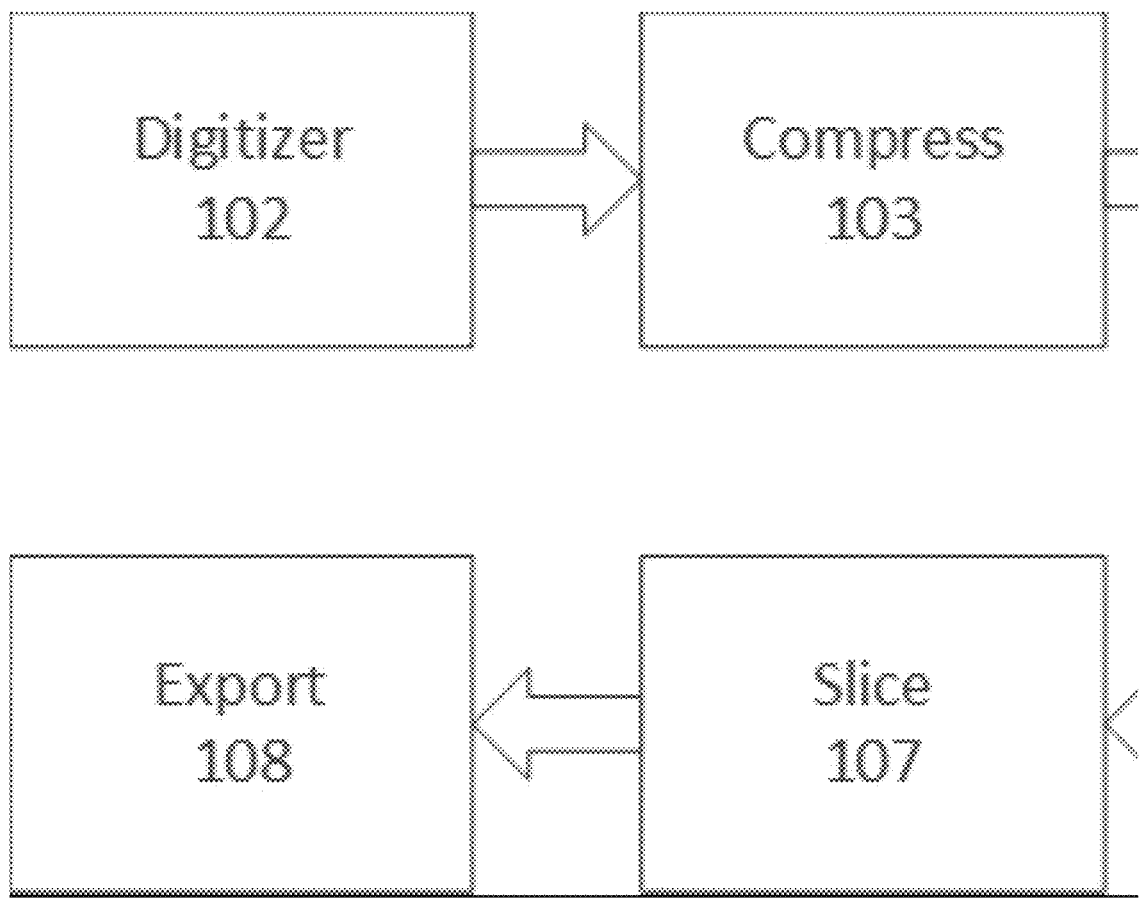
FIG. 2 shows the video exporting process or rather the processes that are involved in from the point where the video is created to the point where it is ready for exportation.
Figure 3:
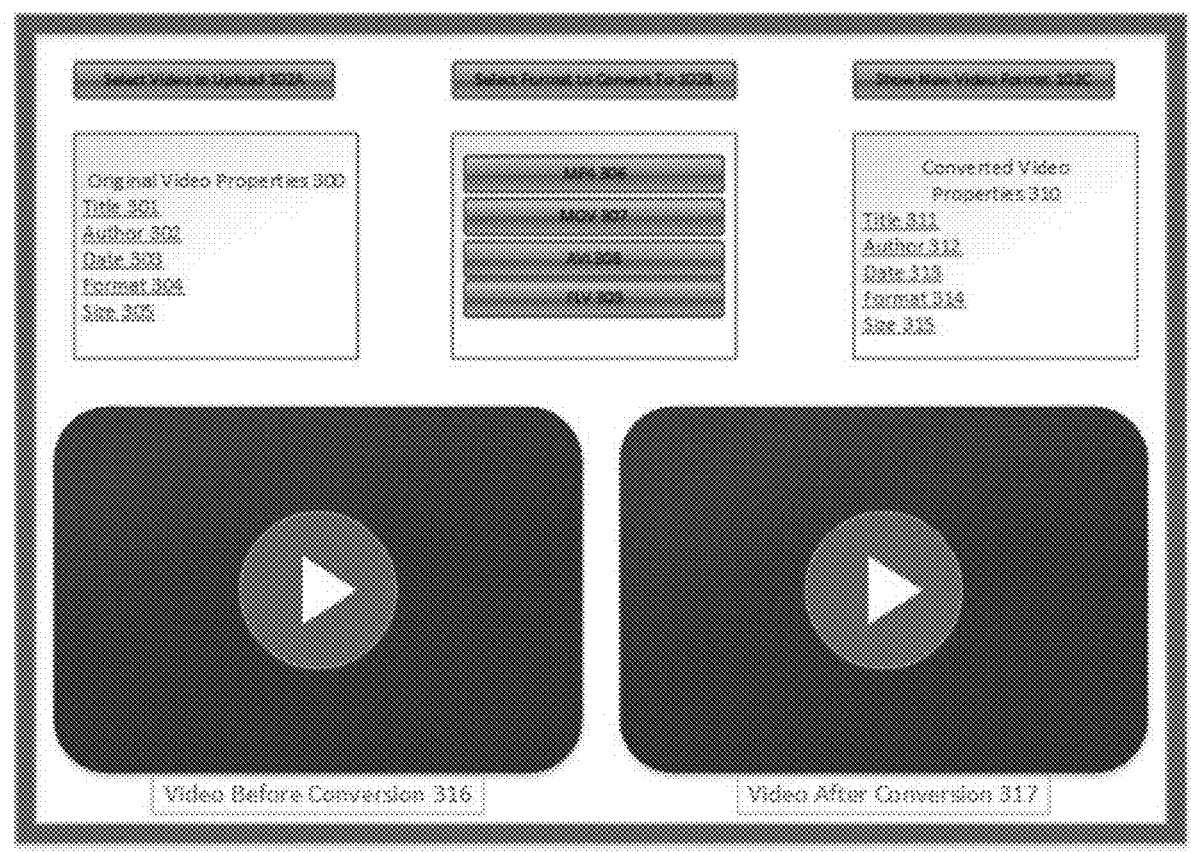
FIG. 3 illustrates the compression process in details. This process also involves the creation of render files.

FIG. 2: This figure specifically features on the process of exporting up to the point where the video is sent over the network for transmission. Therefore, the network is not considered at this juncture. First, it is not assumed that a video is created. So, a video will be created. Upon creation, a video may be in various formats such as Audio Video Interleave (AVI). Flash Video Format (FLV), Windows Media Video (WMV), Apple QuickTime Movie (MOV), or Moving Pictures Expert Group 4). Technically, MP4 supports more videos when compared to other formats. Therefore, this platform will use MP4 as the standard video, but it will also accept the other four types. But any other format will need to be converted, hence the need for the digitizer 102. There will be an interface for the digitizer which will present the current video format and choose the new format that the video will take. Digitization of images is further explained in FIG. 3, which is better explained through conversion. The digitization process will be explained further as indicated in FIG. 3.

The other essential process that will follow is the compression of the video as in the compress 103. Basically, compression is the process of extracting the non-crucial and repeated details and remaining with only the crucial ones. But, since this is a video, there are concerns about the resolution and overall quality. Lossy compression reduces the quality and resolution as well, and therefore it will not be the best choice. Therefore, lossless compression will be conducted. To achieve lossless compression, algorithms are used, which exploit the statistical redundancy which might exist in work. The most efficient algorithm to use in the lossless compression is the Lempel-Ziv (LZ) compression which is the most popular algorithm that is applicable for lossless storages. A table-based compression model is used where during the compression process, a table is generated dynamically from the data of the video input. The table's structure has Huffman encoding, which helps in compressing highly repetitive data efficiently and effectively. The Huffman encoding, also known as the Huffman code is a prefix code that implements a search for repetitive data using the binary search tree and then identifies the areas where there is redundancy in data. The coding then eliminates repeated data and remains only the quality and usable data. However, estimated probability along with the frequency of occurrence is used. The compression then gives out the output, which is essentially a video of lesser size.

Lossless compression does not only compress without reducing the quality and resolution of the video, but it also provides reinstatement of the same data after decompression. An external application may be used for the compression, but the system needs to be independent or standing alone and therefore, compression has to be done internally. In fact, compression will be a backend activity, which will be conducted automatically, once the user initiates the video export process. Things that will be expected upon compression on Compress 103 are the elimination of redundant data, which will automatically reduce the size of the video, after exportation, upon decompression in Video Decompressor 140, the initial size of the video, its quality and resolution will be restored. The same user 100 is presumed to be an exporter and in another phase, a beneficiary of the export, or the individual at the far end of the export destination. The user on the destination end can use or play the video through an opening or downloading and playing, or through compression.

Technically, compression of a video is slow and takes time. But, since the objective is to make the overall process faster, the file will be converted from any other format to MP4 since it is easier to analyze using the Huffman code of lossless compression. This will provide the appropriate and efficient compression of the video. The compression will be able to reduce the video to television standard, which is indeed of much lower size, and decompression will be used in restoring its original size after reaching destination location. To make the compression faster, the video will be broken down into smaller frames. Then, a batch of frames will be compressed simultaneously. The aspect of multi-threading or multitasking is appropriate in explaining this concept, where many tasks can be performed at the same time—many frames can be compressed at the same time. This is one benefit of having a computer with processor 175 being a late-generation processor and that has the high processing power. The high processing power will allow for the many cores to process more threads—frames—at a time and at a much faster speed. Therefore, the hardware is a key consideration as far as video compression is concerned and the whole process at large.

Encoding/transcoding are other essential tasks to be carried out in the process. After the video is compressed, the file needs to be secured. The sequence is illustrated in FIG. 2 where after the Compress 103, Encode/transcode 104 follows, which is then followed by splitting and replication. The encoding process is discussed in details in FIG. 4. But, to the brief of encoding, two types of video encoding will be conducted into videos in this exportation process. One of them is the encoding that is accompanied by rendering, and the other one will be for security the video before exporting it. The first type of encoding involves a combination of footage and associated sound and combining the two codes to form a video file that has graphics and sound. Then, upon rendering, the video file is decompressed so that it can produce a playback. If the video plays accordingly, then it is fully rendered. The other type of encoding handled in Encode 104, and further elaborated in Encoding 110 ensures that a video is transmitted over a network as it is. Without the security, the video cannot reach the desired destination. Indeed, the video cannot have the address of the destination that it needs to arrive to.

Further, the file needs to be replicated to two or multiple files depending on exporter's privileges where they can choose the number of destinations to export the video to. For instance, if there is a large number of users in the same network who seek to receive the video, the exporter can include their addresses during encryption and exchange decryption key with them. Then the video will be replicated depending on the number of receivers on the wait. Replication is a reproduction of exact or similar copies of the initial file. Replication is also known as cloning, and in this case, it will be a feature for use only by the exporter or rather the users of this system. If the exporter is interested in exporting a video to ten destinations, the same number of replicas of the original image will be created. They will then be assigned destination addresses upon being transmitted over the network. The unique addresses will also be included in the slices that will be created per replica as illustrated in FIG. 6. Various protocols from Protocols 190 will be used in ensuring that the file reaches its destination without any obstructions. Each network model has a set of protocols that facilitate the transmission.

Figure 7:
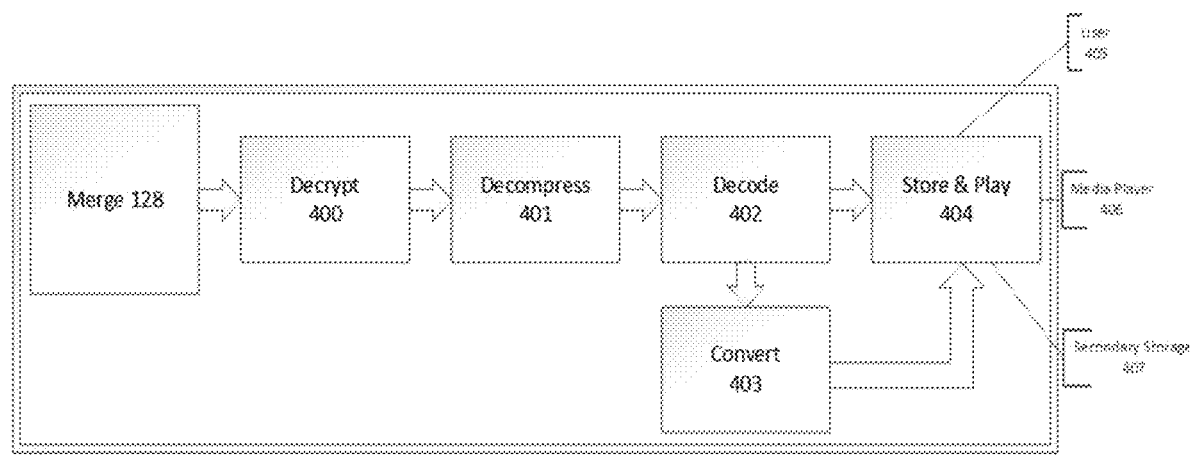
FIG. 7 illustrates the steps that are followed in ensuring that the video is rendered and therefore playable after arriving at its destination.

Header addresses will be assigned to each replica. The header information will also contain encryption details, which will be combined with headers that will be assigned to the files by network protocols to facilitate their transmission. This will be followed by slicing as shown in FIG. 2: Replicate 106, then Slice 107. The slicing will be done on each replicated file as indicated in FIG. 6 where the 126A and 126B are the main video and the replica, which are then sliced as shown in Slice A1, Slice A2, Slice A3 . . . . The slices are then assigned addresses over on networks 127A and network 127B which are a representation of the networks that are created to adapt the sets of slices from each video. The process of transmission of slices is illustrated in FIG. 7 about each process that is involved. The file slicing functionality has not been implemented before. However, this framework will be more advanced since it will need to slice the files instead of trimming them—no file will be discarded. Another unique and new feature that will be implemented is the aspect of automatic slicing.

Technically, the slicing process can only be done upon command. But, in this platform, it will be a default backend process which will be conducted automatically. The files after splitting will need to be joined again in the future, and therefore, the reverse of this functionality will be required. Also, this will be required to be done automatically. FIG. 6 illustrates that four slices can be made per file, but this is not the standard requirement. The number of slices will depend on the size of the file and the available bandwidth. If the file will be large and the bandwidth will be large as well, many slices will be made, but if the bandwidth is small, then a smaller number of slices will be created. Also, if the video will be of small size, then a smaller number of slices will be created. This requires the platform to require a test to be conducted on the network to check the bandwidth limit and more importantly, to analyze the nature of traffic on it. A brief explanation on how to have a large bandwidth will be illustrated. Traffic, however, is an issue for public networks or a network that has a large number of users. Large organizations that have a private network used by their large number of employees may have their networks busy, therefore having a reduced amount of unoccupied bandwidth at times.

The bandwidth may not be effective for a certain number of slices of given sizes, which may require bandwidth optimization to be carried out. Thus, Bandwidth Optimizer 200 is used here. But bandwidth optimization does not have to be used as instances, and it may not be the only option to facilitate smooth transmission. One of the other efficient routines that can be used is to carry out the export at times when there is no traffic on the network. But, since an analysis on the network is important to identify the bandwidth available, the system can do various tactics to optimize the bandwidth. Some of these tactics or techniques include conducting a network diagnosis to eliminate any issue that may not be of great importance in the network. Software as a Service (SaaS) will be considered here especially in helping in bandwidth optimization. Thus, an external application will be implemented on an analysis of the network and optimization of the bandwidth, especially in organizational networks. However, bandwidth optimization will be looked at from two perspectives—hardware for on-premises local networks and cloud networks. Hardware solutions, as discussed earlier will require bandwidth optimizer 200 be developed as a network with a high rate of reliability.

The last feature to focus on in FIG. 2 is the export 108. This is the procedure that follows after the other procedures. Indeed, the above description of how to make the transmission efficient could be understood better under exporting. Indeed, 108 explains the whole exportation procedure at large.

FIG. 3: This figure specifically illustrates the video conversion process and preview. The figure, however, shows the interface as a module that the video exporter will have to interact with as part of the exportation procedure. However, it may not be mandatory for the exporter to convert the media if it is in standard file type or version of MP4. User 100 will select the video to be exported by clicking on the button 102A. The system will then display the properties of the video, which may be contained in the file's header information or the metadata. The most crucial information that will be displayed includes file title 301, the copyright, ownership, or authorship information under author 302, date of creation at Date 303, video format at Format 304, and size and capacity of the video at Size 305. The after converting the video, the same information will be displayed on the other end of the converted video properties 210. The properties will be shown under Title 311, Author 312, Date 313, Format 314, and Size 315. There are exceptional cases, however, when the user may need to convert the video into a different format other than MP4. In such a case, the user will need to select the format from the selector 102B. The selector will then show four file formats that the video can be converted to. The formats are MP4 306 for the MP4 file format, MOV 307 for MOV file format, AVI 308 for AVI file format, and FLV 309 for FLV file format.

Considerably, it is important to have a preview of the video before conversion and another one after conversion. The previews are provided as shown in FIG. 3 in 316 and 317. This will help the user compare between the input and the output and therefore decide whether to stick to the output or to try a different output format. The difference in file formats also affects them in various aspects which include quality, resolution, and others. For instance, MP4 is more compatible with most media players, and its structure allows for a high rate of lossless compatibility and smaller file size. However, the exportation requirements of the user may require them to export it in a different file format, which they have to comply with. For instance, the destination file is of a Mac OS or iOS user, MOV is the preferred format to export the video in since Apple develops its encoding algorithms, making the videos viewable better through on Apple electronics while in MOV format. Besides, some media players such as Windows Media Player only support MOV format natively and do not support the files.

The backend processes of converting the media file from one format to another as in FIG. 3 will require the use of various algorithms which include web-based or cloud conversion or conversion by use of existing external applications. But, web-based conversion also requires the same algorithms since the tool to use in the cloud are software based in SaaS. Some videos may be converted from the television signal and therefore have to be converted using a field rate conversion algorithm that has to ensure that the film can be encoded and comply with the standard formats required. The compression strategy is further illustrated in FIG. 4. Compression of a video determines its playback.

Figure 4:
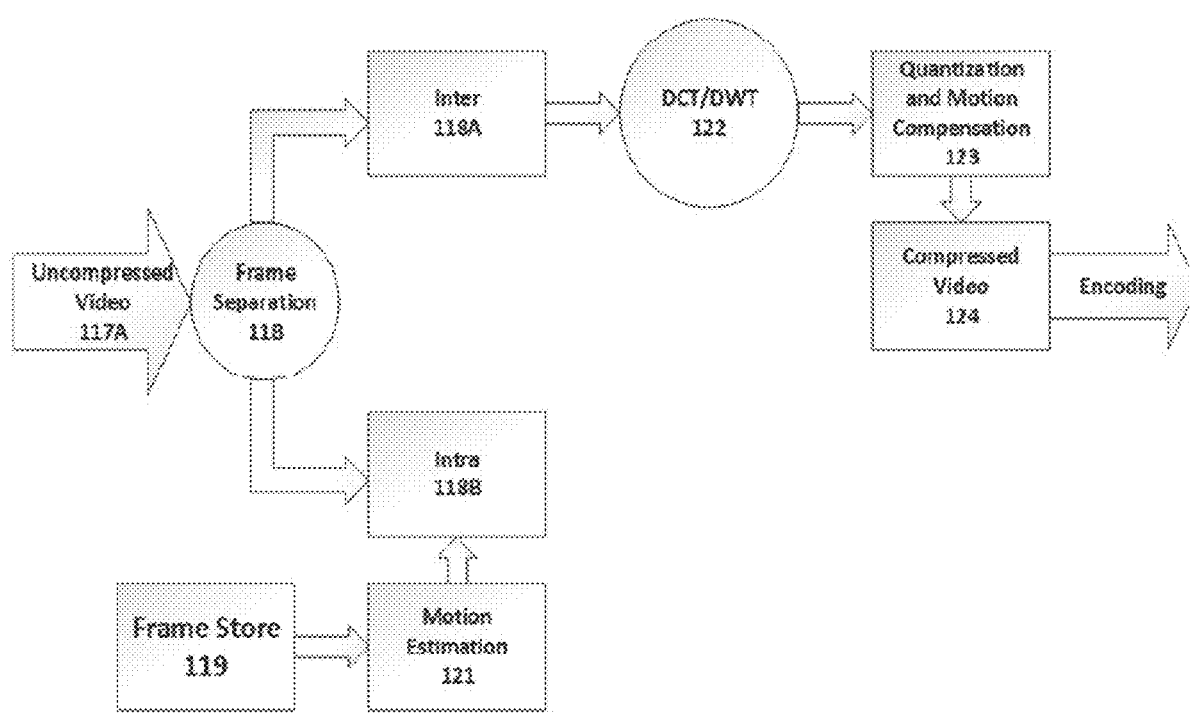
FIG. 4 shows the video encoding process. The rendering process accompanies the encoding process.

FIG. 4: This figure gives a basic video compression process. The first step as shown in this figure is frame separation 118. This involves finding the frame difference—distinctions between two or more video frames. Since videos incorporate both videos and audio, frame separation involves separating audio frames from video frames and also separating the graphics frames among themselves between those with high pixilation from those with low pixilation. Thus, frame separation 118 will involve various activities. But before this begins, they have to obtain the frames from the frame store 119. This is a storage space where the video is located. A process known as frame extraction is carried out in obtaining the frames from the store 119. This will follow after user 100 initializes the step of exporting the video. The extraction process 400 will be conducted through the transfer of a particular file from the point of storage or the current location for further processing. Presuming that the video was being worked on, the retrieval or extraction is conducted faster and easier. After frames get extracted, they will be made dynamic, which will make it easy for them to be used efficiently. The same extraction process will be required in the process of decompressing the video when it reaches the user over the other end.

MPEG-2 standards, which are used in encoding MP4 video formats is of great use are extraction. The major reason for picking this standard is because of its aspect of including four parts which are the video, the audio, the system, and the detection and testing for the video and audio streams. Therefore, using this approach will help in giving assurance that indeed the appropriate video has been selected and is being compressed before it is encrypted and sent over a network. The MPEG-2 standard is one of the major 401 standards and the most recommendable one for use in frame separation. There are three layers of divisions in this standard which are the basic stream, the multiplexed transport stream, and the elementary packet stream. Again, this standard will take care of the transmission process of the video, which will speed up the other processes involving manipulation of the frames. The elementary video stream (VES) makes up the basic steam, which is encoded through Video Elementary Bit Stream and will be of great use in compressing the video graphics, and more importantly, the Audio Element Stream, which will be used as an audio compression standard for compressing the audio.

Therefore, it is a basic requirement that the frames of the video have to be separated where the audio frames will be put apart with video frames. Then, the respective standards will be applied in compression of the two sets of files. However, video compression will require more working on the frames, where the DCT/DWT 122 algorithms will be used along with Quantization and motion compensation 123 will be carried using various algorithms such as the Huffman frame compression algorithm before obtaining fully compressed frames for the video. The audio too is compressed using MPEG standards, which requires them to be converted to MP-III or MP3. The MP3 frames are also compressed using the DCT/DWT encoding standards. Indeed, they go through the same steps as those of the graphics. But the procedures explained below are for both graphics and audio for video encoded using MPEG stands. But this does not mean that videos in other standards are not accepted, they are. But they have to be converted first. Technically, this makes the process faster since there are not many separate steps that are required.

Basically, a video contains audio and video—images in motion—frames. In the compression process, the motion estimation process has to take place in sequential mode as illustrated in FIG. 4 in Motion Estimation 121. This process involves several activities which include calculation of motion vectors which will involve finding matching blocks in the frame to be developed in the future in correspondence to the current frame. This process is efficiently used in the detection of temporal redundancy. Various algorithms can be used in this process, but they use an underlying assumption that only translational motion can be compensated for rotational motion and it is not possible to estimate zooming by use of block-based algorithms. The rotational algorithm is known to be the most important and computationally insensitive process in a video compression algorithm. Another consideration to put forth in running the estimation in 121 is the aspect of frame rate, which can be described better by frequency. Basically, the frames range between 15 and 30 per second, and there is no large motion of an object between two successive frames. These are some of the basic facts that are primarily considered in the estimation process upon compression. Therefore, the search algorithms to be used will search for a matching block in various positions of graphics for next frame. The searching will be carried out in the search region.

An efficient technique that may be relied on at this juncture is the best to match, which uses a searching algorithm to identify the current and next frame. The value found in the search is then put against the Mean Absolute Error (MAE) to determine its relevance and reliability. Matching between current and the future frame is done by use of magnitude where smaller magnitude means better match and vice versa is true. The block displaced with the minimum MAE is taken for calculation of the motion vector. In this work, a three-step algorithm is used which involves three steps of finding the closest match between frames in the compression process. The three-step search algorithm is the simplest one to implement, and it gives assurance of robustness and near-optimal performance. It works through searching for the best motion vectors in a course to the fine search pattern. In the first step, a combination of points, say 8 or 16 are taken from distances in a step size from the center; there they are then compared. The second step involves halving. This takes place through moving the center to the point with minimum distortion. The first and second steps are repeated over and over until a step size that is smaller than one is arrived at. The third and last step involves interconnecting and converging the step size.

DCT/DWT 122 are different conversion strategies that are used in the video, which are technically important in ensuring that the video is successfully converted. DCT stands for Discrete Cosine Transform, which functions by the image and video compression standards. The DCT is also used as a derivative of the Discrete Fourier Transform (DFT) which controls the variation of Digital Signal Processing (DSP). Fundamentally, DCT is used in the transformation of the spatial domain representation of graphics for the spatial frequency domain. Below is the formula that will be used in the DCT 122 compression. Finding each waveform describes best the DCT transformation in the compression process. The finding of the wavelength can be associated with corresponding weight Y9k-1) so that the sum of 64 waveforms scaled by the corresponding weights Y(k-1) may yield the reconstructed version of the original 8×8 block of the media file. DCT allows for compression to be conducted at a very high rate and allows for minimal block artifact that is present in many other transforms due to the periodic nature of DCT. This gives a lossless compression process, which makes it the best transformation method to use in this case. This is again because the compression process 103 seeks to be achieved in a lossless way. The only issues with this compression strategy are that it presents a finite word-length in the microprocessor and therefore there is found the loss of information due to rounding and truncating of calculated DCT values. Further problems may be found where the information loss is irreversible. But this is not a big issue as it is only part of the metadata that is lost whole other crucial details such as the quality and resolution will be retained, which are the most important details.

Quantization follows DCT compression in 123. The back-end compression process considers the fact that human eyes are not sensitive to the high frequency of graphics. Thus, if the compression process involves removal of high frequencies, no perceptible loss can in the content be realized in the quality of the graphics, which is the basic principle that quantization 123 will bring about. A DCT operation above will help in obtaining the spatial frequency content of the video graphics. Quantization, therefore, involves the removal of the spatial frequency content in the graphics. This process may use references from the standard values of quantization tables that are used in the processes of seeking deemphasizing of higher frequencies in DCT graphics. However, it is a lossy process and therefore causes some irreversible loss to DCT as mentioned above. But again, the loss is bearable.

Quantization is done along with motion compensation on 123. Indeed, motion compensation is similar to motion estimation regarding the steps involved. This is done as a bandwidth optimization step which literally reduces the bandwidth requirement for sending frames. It achieves this by sending only the frames indifference rather than the actual frames. Motion vectors which are produced in the process of motion estimation are used in motion compensation in producing the predicted image in the encoder the same way it would be produced in the decoder. The two sets of graphics—the current frame and the compensated one are subtracted, and the difference that is obtained is sent to the receiver along with the motion vectors. The decoder, therefore, can produce the exact copy of the future frame by means of compensating the motion of the current frame using the motion vectors and then adding the difference image.

Figure 5:
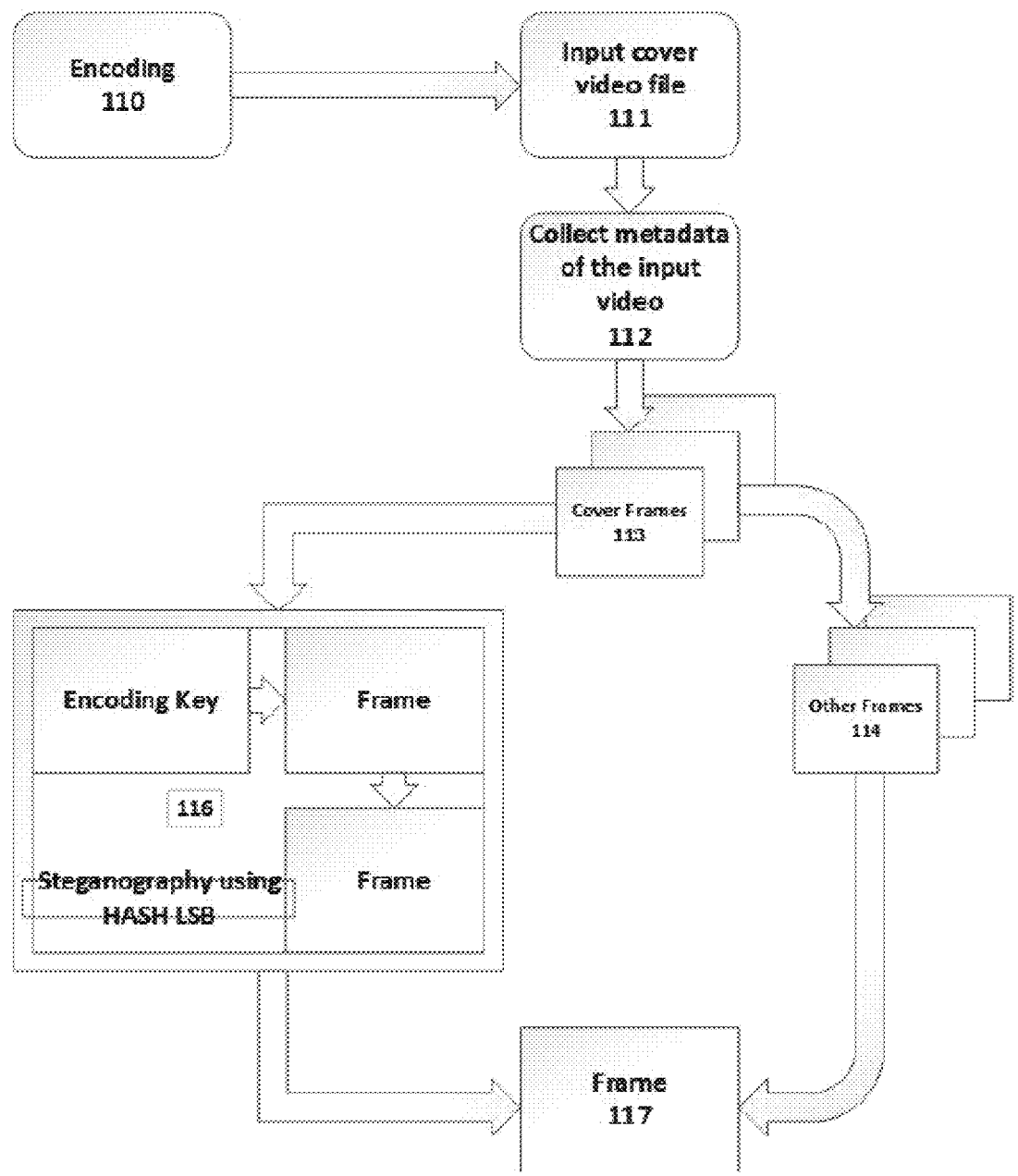
FIG. 5 shows the process of replicating or cloning the video files and slicing them, which is followed by exporting them via a network.

Upon explanation of the Compress 103 entity under FIG. 2, it is illustrated that Huffman encoding algorithms will be used. The Huffman encoding works through the use of entropy encoding and is based in Shannon's Information theory. The theoretical explanation of the theory is that the symbols which appear more frequently should be represented in fewer bits, which ones that occur less frequently should be represented in fewer bits in the compression process. Another code that should be referred to and works the same way is the Morse code. After conducting these steps, the video and the audio frames need to be combined and protected using a cryptography method that secure and at the same time hard to break. This will allow for the transmission of the video to be conducted efficiently. FIG. 5 below illustrates the process that will be followed in the processes of encoding and transmitting the video.

FIG. 5: this figure illustrates one of the most crucial parts of the work to be carried out in this video, which is to conduct the encoding and encryption process. Encoding goes hand in hand with rendering. But these steps do not require much attention since the only basic requirements are to verify that the video is working well and that it is providing the right information—audio and video, and is in the right formats. In recalling, the encoding process that is required has to use lossless compression methods which have already been discussed. To eliminate the confusion between encoding and compression, encoding involves ensuring that the video is in the right format, which goes hand in hand with rendering which ensures that the video is playable. On the other hand, compression involves reducing video sizes. But, these two processes have to use graphics and audios in frames. Compression takes place in working on the frames separately as illustrated in FIG. 4 while encoding combines the frames after compression. Therefore, a video after compression of a smaller size when compared to a video before compression.

In this system, a block encoding process will be applied as illustrated in FIG. 5. This is an efficient encoding method as far as the security of the system is concerned. One benefit of this encoding process is that it will be in a position to support a variety of formats, including the four major video formats recognized in this application as indicated in FIG. 3—the MP4 306, MOV 307, AVI 308, and FLV 309. However, this process will work by priority where it will first consider AVI 308 video formats, but only if the user specifies them. Presumably, the conversion process may involve quantization the same way it is required in compression. But in this case, quantization is required for converting the video signals if they are analog to digital. The encoding process uses the compressed frames and resolves to find the 4LSB bits for RGB pixels for the cover frames. In this process, the message is converted to being secret. The process of making the message secret or encrypting it will be done on the frames individually. Since MPEG standard supports high-resolution videos, the graphics will be assumed to have multiple colors, and therefore, RGB pixels, which will be in frames will be considered. The RGB color code is basically known to have 24 bits value per pixel, which is equivalent of 00000000, 00000000, and 00000000 for the back pixels and 11111111, 11111111, and 11111111 for the white pixels. The last four Least Significant Bits (LSBs) will be considered in each RGB pixel value. This will take place immediately after inputting the cover video at 111, collecting the metadata at 112, and putting in place cover frames at 113. The metadata and the encryption key are embedded within the RGB pixel value.

Precisely, the embedding of encoding key in the frames using the LSB hashing as illustrated in 114 is done the last four bits of the RGB pixel standards. Still, in 114, more will be done which will include the conversion of the encryption key from character format to Binary format. This will indeed be conducted ceremoniously. However, it is important to note that the cryptography information is converted into binary format and embedded into the created frame blocks before being be made a complete compressed and encoded video. This will greatly favor the replication and slicing processes before transmission of the videos. Blocks carry the same information, and therefore, any replica or slice will carry the cryptography information with it. Irrespective of the number of frames available in a video, the cryptography information is availed and embedded in each set. This information is similar per video but unique per different videos, and it is therefore important in transmitting a video in different packets considering that the video will finally be merged to together later using the same information even after splitting. The video whose frames are already embedded with the encryption key is identified as a stego video 116 (one on which steganography has been performed already), and the process is identified as steganography. The input of the video, however, does not change which will provide the same video regarding content (graphics and audio), descriptive information, bit rate, and other crucial details after reaching its destination. Hashing or using a hashing function greatly improves the security. Hashing involves converting the security key into a collection of numerous hashes—strings of characters that look random and which are way longer than the password or key. They are however not random since they are mathematically transformed into a format that cannot be misused or hacked.

Technically, it is only a reverse conversion strategy that can be used in reversing the hashing. Basically, according to the instructions given above, the hashing function will make the video more secure during the exportation process. After exportation, the recipients may provide the key for accessing the videos in cases where the videos may require a high level of secrecy. But this is one layer of security; there are other two and perhaps more on top of it. This is because, from this layer, the packet transmission system has to include another layer of protection. Another layer may be added when the export may be required to be conducted over a Virtual Private Network (VPN). But this is not a restriction. More security protocols may be implemented. At this level, however, the frame 117 is one considered secure. But, frame 117 represents a large number of frames that have already been assigned private keys for identification and for use in identifying the frames that belong together during the merging process. The other frames 114 are those that will have been worked on before since in large videos, the frames are worked in batches and each batch will have a given number of frames. Also, as illustrated in FIG. 4, audio and video frames will have been processed differently, and they will, therefore, be produced at different times. Overall, the encoding process involves protection of the frames and assigning them the private key to allow for their transportation in a secure mode.

An algorithm will be used in achieving the above crucial process which will involve performing eight basic steps. The first step will be to input the video, which will be borrowed from frame store 119 in FIG. 4. But it will pass through the compression processes indicated in the figure as explained above. The next step in this phase will involve reading the required information from the video file itself and the associated metadata in 112. The video input will be fetched from the input cover video file 111. The compressed frames will then be obtained. Another very crucial step will follow, which will involve finding the last 4 LSB bits in 116 for RGB pixels in the frames. A hashing function will then be used in finding positions to embed encryption keys. The next step will be to convert the key into binary format and then to hash it. Having done all, these, the video frames will be regenerated with information that they did not have before. In hashing using LSB, a rare technique identified as the steganalysis technique will be implemented. However, the technique will not be expected to yield very significant results as it will be used by user 100 to confirm if the LSB hashing implemented will work efficiently. It will typically use some redundant information since the details added in each frame, particularly cryptographic information will be the same for the frames. But this may be enhanced using neural networks and more sophisticated support vector algorithms, but this may be work for the next patent which can be developed from this one. The analysis could be used in showing a correlation between adjacent frames in detecting special distribution model across the frames. But this will not work better for MPEG standards or the MP4 file formats while compared to the AVI. Frames in AVI have a tenderness of behaving differently, which makes the method suitable for such formats.

FIG. 6: This figure involves several major actions where among them there is a replication of the video, which is followed by slicing the video into many portions, transportation, and then merging the slices upon reaching the destination. Also, decoding is done upon the video reaching destination which is another action that is carried out in this stage. Also, the properties of various video destinations that will be implemented will be explained under this figure. This figure shows the processes that follow after a video will have been created, converted, compressed, encoded or encrypted and now ready to be duplicated and sliced, and then transported to the given destinations as per the requirements of user 100. The process starts with replicating the video. This will be done to obtain copies equal to the number of intended recipients. Thus, user 100 should have prior knowledge regarding how many users they need to send the video file to. This, therefore, will not be just a backend process that would not be controlled by the user, neither will it be under the user's full control. Rather, it will partly require user's assistance to deliver optimal results.

Thus, the user will need to provide destination addressed. Depending on the number of destinations, replicas of the main video file will be produced. However, some more information will be added to at replica video 126B and other videos like it, which imply that there will be a slight alteration. But, since the alteration will be done after the video file will have been replicated already, the editing will be done to each replica. Upon editing, recipients' information provided by the user will be embedded. Since the video will be sliced further, each slice too will carry the information provided by the user regarding the various destinations. The same information will be used in routing to allow for the assignment of similar destination addresses for a slice, and for them to be merged. The file replication service is offered in Windows OS, but for the same to be supported by other operating systems, several adjustments have to be made. For instance, in Windows, there is the DFS replication process that is done on servers. But, considering that this system is implementing could services, an application on the cloud, which will be used by Software as a Service (SaaS) will need to be used. In borrowing the technology used in DFS, a state-based replication engine will be used. In the cloud it can be accessed remotely and also on premises, it can be accessed through means of the real-time networking process.

File replication could also be identified as cloning, only that the two terms differ in areas of application where replication is more technological while cloning is more biological, especially concerning genetics in DNA cloning. But, the theory behind the functionality in both cases is similar. It basically means to copy cells. In the replication to be done in this case, a data grid will need to be created to come up with an algorithm that will facilitate the replication. Here a Grid Data Management Pilot (GDMP) too will be required. As indicated earlier, storage management functionality will be required at this juncture to smoothly coordinate the storage process for video file replications 125B and other that are alike, which is again determined by the number of recipients. But, the major task that will be performed by the tool will be to coordinate the replication procedure. Also, coordination of the network will be crucial since the network for the replication need to be coordinated. There are classifications of existing file replication techniques that can be adopted. But they employ the networking concept, and none of them facilitates any further processes that may be conducted after replication apart from transmitting the file over a network to the destination. But, in this application disclosure, another crucial action, slicing, will be done before transmission of the file. Various techniques may be adopted, but they will have to be restricted to only replicating the files without initiating the transmission process or rather going to the transmission phase.

There are two major classifications of replication techniques which are static and dynamic. But we will prefer to adopt the dynamic ones due to their great advantage over the static ones. The only reason as to who static techniques may be adopted is the fact that destination addressed are assigned manually, which might be a critical requirement to avoid false destination addressed being assigned and files end up being sent to the wrong recipients. A technique to be used in the replication will need to be dynamic, but it will borrow some important features used in static techniques. Also, a partly transmission and a partly replication strategy will be implemented. This strategy will favor destinations that may take time to receive the files. It will involve converting the receiver computers to nodes that can be accessed by other computers that may take more time to access the files. For instance, said receiver or destination 129A had received the file, and 129B has not yet received it. Destination 129A will be converted into a server after receiving the whole file, and destination 129B will be able to source the video from both sources—the main source 126B and the peer destination 129A. Thus, the creation of a peer network will be necessary.

But, the method above may create conflicts in decoding the encryptions. This will, therefore, require the user at destination 129A to share the encryption keys with the user at destination 129B since they will have to access the same file. Another possible conflict that may occur is the aspect receiver 129B receiving both files from the main source and the peer at the same time. This may end up consuming the bandwidth from the fact that the incomings signals will be in large quantities. To cope with this issue, the receiver, after getting the exported video from one recipient, either the peer or the main exporter, will need to reject any other connections and concentrate only receiving from one source. If the signals arrive at the same time, the file from the main source will be given higher regard. The high regarding will obey the fact that the specifications of the peer user's computer are not known and the connection may be insecure.

The slicing process follows successful replication. File slicing will basically involve partitioning the replication file into multiple smaller files. The essence of this will be to ensure that the file is in smaller portions that are easy to transport. If a file is of 100Mb in size, it may be replicated into ten pieces of 10Mb each. Transmitting a file of 100Mb in the same network takes more time than transporting several, say the ten files in ten different network connections. Typically, many technical terms can be used in explaining this process. It can be termed as splitting or slicing. This application disclosure can adopt various splitting frameworks. This is another instance where the Windows version of the application will be operated easy. This will be realized through the aspect of Windows having inbuilt tools that can do the splitting, just like the partitioning process of a hard drive. Each algorithm, however, will consider splitting portions of equal sizes, as illustrated in the example. The Windows version of this application will adopt the inbuilt functionalities of the Windows OS. Two approaches of splitting will be chosen from, one of them being the use of spanned pieces and the other one being the use of blocked pieces. In coming up with spanned slices, one identical slice will be sent to multiple destinations simultaneously. This is indeed an ideal way of sending the slices. But, the only issue with this method that it does not give a way through which it can be used in the creation of the slices 106A through 106H. But, it is the ideal method of allocating the same slices after they are created.

Nonetheless, the backend functionality of third-party applications that carry out the splitting process will be borrowed. The sequential steps for splitting that are borrowed from these applications include the creation of a compressed file, which will have already been done, then a custom size will be set. In setting the size of splits, a function will be set to divide the slices into equal portions and to ensure that the larger the file, the more splits will be created. The conditions for splitting the files will be file size, and the bandwidth available. It is important to note that the splitting will be done on each replicated file as indicated in FIG. 6 where from the main file 126, replicas 126A and 126B will be created. Thus, slicing will be done to each replicated file. The pseudocode below will be used in creating the function:

If (size>100MB);
Split=file/10;
Else if(size<100mb);
Split=(file/10)/10))$$;

As per the pseudocode above, a file that will be of 100Mb or less in size will only be divided ten times. But, files that will be of capacity that is greater than 100MB, two types of the division will be done where for each 100Mb, ten divisions will be done. There are other SaaS applications available in the cloud which could also be used, but since the system has to be original, an original inbuilt splitting functionality has to be used. The splitting has to take care of the process and ensure that it is lossless just like in the compression process. This is done bearing in mind that the quality of the videos will have to be retained. The splitting process will be initiated immediately the replication is completed as shown in FIG. 6. Bandwidth consideration may come into place too at this juncture. This will call for analyzing the bandwidth and finding out its availability and the speed at which it can support the transmission of packets. Therefore, other than bandwidth optimization 200 which was discussed earlier, bandwidth analysis will be required. After conducting the analysis, feedback will be issued on the amount of available bandwidth, and the time that it may take when compared to the file size and the total number of destinations. Thus, bandwidth monitoring will be essential especially in giving crucial information regarding how efficiently the video may be exported to the destination.

Bandwidth analysis may be done manually through accessing the router directly, or through accessing the network information through system settings of the operating system of the computer being operated by user 100. The analysis will help the user make some ideal decisions regarding various issues associated with the transfer of the data. In analyzing the bandwidth, there will be several requirements which will include source IP address, destination IP address, source port and destination port, the networking protocols that will be used, an interface to visualize the system analytics algorithms which will collect the bandwidth statistics and compare it to the statistics of the video files to be exported and give analytical feedback. However, local exportation will demand less. Indeed, in local exportation, the most crucial thing that will be required is a location directory address. Local exportation is the transfer that will be conducted within the same user computer. After identification of the directory, the local transfer mechanism will be implemented, but it will also use protocols that are similar to the ones used in networking such as the file transfer protocol (FTP). But, the destination location will need to be confirmed of its existence to avoid transferring the file to the wrong destination. Online transfer onto the cloud will be as much demanding as when exporting the video over a network or rather an external transfer.

Cloud exportation will require internet supply. A limitation, therefore, may be easily posed by lack of sufficient and adequately fast internet connection. It will be therefore the responsibility of user 100 to ensure that they have a strong internet connection with a high upload speed or more than 5Mbps. This is because cloud computing will involve uploading the files into the cloud where users will access them from there. Therefore, the concept of cloud file sharing will be incorporated in this case. The basic process of cloud file sharing will again require an ISP that will provide cloud space or storage for the file. Since the exportation is private and need to have the files delivered to specific users, unique addresses for the users will be created, and they will need to be connected to the internet for them to access the files. Also, they will need to have the private key that they will use in the attempt to access the files from the cloud. Typically, the process can be compared to the process followed in sharing files via Dropbox or Google drive where the recipient should own an account in either cloud platforms for them to access files over the internet. This is indeed a crucial consideration to implement to ensure a secure and fast private connection and data transfer.

Thus, three types of transmission may be conducted in the exportation of the slices as indicated above which are local transfer—within the same computer, networked external transport, and cloud transport. Unlike in networked transmission, local transfer within the same computer—from one directory to another—pointers are created with the new address and sent to the export destination. The pointer also acts as a link that leads the user to space where the file is stored in the database. But, one important consideration that will have to be taken into account is the fact that there are different file systems. FAT32 and NTFS are the commonly known formats. FAT (File Allocation Table) 32, or exFAT (64-bit version) if formatted in ASCII, EBCDIC, and BINARY formats which, same as NTFS, which are supported by the format. FAT coordinated the linking or creating links to different directories through a table. But, this format is not accepted by Operating Systems. Also, NTFS has a different file format, and both formats are commonly used in Windows-based file transfer or rather users of computers powered by Windows OS. Technically, there are more considerations to put forth, one of them being the fact that users are running other operating systems such as Linux-based ones. Technically, there are different ways that file transfer methods and formats can be changed which include changing the formats. For example, changing formats from EBCIDIC to either BINARY or ASCII can change the transfer methods and formats efficiently to the one that matches the format in the host computer.

Considerably, the file type does not change unless any video-playing software in the destination cannot support it. While now focusing again on network 127, which inclusive of 127A and 127B, it is noted that bandwidth analysis and bandwidth optimization are necessary steps that will need to be carried out to make it easier and faster to transmit the files. Also, it had been briefly discussed that transmission over IPv6 would be more preferable while compared to IPv4 or other transmission technologies. IPv6 is an IP addressing system that is more unique and typically different when compared to IPv4 regarding speed and security and reduction of latency, which makes it the best choice to go for. Besides, it is has a technically great ability to support larger files and transmit them at a higher speed. This addressing system is based on Hexadecimal Numbering System which uses a radix base of 16. It represents the value in a readable format and uses nine symbols for representation of from 0 to 9 and A to F. A global unicast addressing system is used in IPv6, which works in line with the global routing prefix. This is represented by the implementation of an address with three sections. The three sections are divided where the first 48 bits of the total 128 bits represent the global routing prefix, the second 16 bits are the subnet ID, and the last 64 bits are the interface ID. As observed, the global prefix bits are way more than those of IPv4. This makes it possible for the address to stand out uniquely among thousands of others. The same address is applicable in local settings, which makes it again uniquely identifiable and cannot be conflicted with others. This again presents another benefit or advantage of using the IPv6 addressing system-which is the aspect of allowing form exportation of the video the numerous destinations.

In destination 128-128A and 128B, very crucial activities take place. These activities are to merge the slices, decrypt them, and decode them for playing. Then, the video is allocated storage space in destination 129 where the recipient of the export can access it any time of need. The merging, however, will not involve many struggles while compared to slicing since no creation of unique addresses will be required, and instead, unique addresses will have been created, and the slices with different addresses will have already been transmitted to their respective destinations. Thus, slices reaching a destination will have the same encryption key, and their header files will be similar. This means after merging, the addresses or header information too will merge as one, and therefore one file will be created. The process of decompressing will therefore follow, decoding or rendering processing along with decryption processes will be carried out as well. These processes will be carried out to ensure that the video will be readable and playable in the destination. These processes are further explained in FIG. 7.

FIG. 7: In this figure, it is assumed that a file has already reached its destination and is now being worked on so that it can be readable. The process follows the various steps illustrated from 400 to 404. The first step 400 is to decrypt the encrypted file. File. As illustrated earlier, the file will have arrived and merged, and the header information merged as well. The header information contains the information to be used in this process. But, as it is illustrated in the encryption process 116, an LSB hashing function will be implemented, which will require the receiver of the export to have a key for decrypting the file. Therefore, the individual will need to receive it from the importer. The key may be exchanged through other means. But, since this process is time sensitive and seeks to make the process faster, it will involve making the IP address of the recipient the decryption key. So, if a file will have been sent to the wrong destination, by mistake, which might be a different IP address from the one that had been assigned as the receiver of the file, then it may not open. This rarely happens, however, and therefore, the video will be decrypted immediately it reaches the export destination. For videos that will be exported locally, there will be no necessary encryption processes required.

The decryption process 400 is then followed by another very crucial process identified as decompression. This is a process of restoring the video frames which will have been compressed. The compression process will have reduced the size of the overall file significantly by the decompression process will restore the initial video size since the lossless compression process will have been implemented. The video decompression process is the inverse or the reverse of the compression process. Therefore, the steps involved in compression will be reversed. The whole process as explained in FIG. 4 will now be done in reverse mode where the data will be decompressed through use of the same processed such as quantization and motion compensation in 123, and motion estimation in 121, which will focus on creating a reference point for the encoding processes to be conducted. Also, the same DCT/DWT algorithms will be used not in reverse mode. This will considerably mean that the file will be restored as it was initially. Technically, color space conversion will be required depending on the various requirements in the destination folder. Also, granting of permission for conversion is another sensitive issue that has to be keenly focused on. For instance, the user 100 may need to restrict permissions for alteration of the video upon reaching the destination. The user will, therefore, need to set privileges that will be allowed and the restrictions that will not be allowed.

The completion process of compression of the video streams has to feature into the way of color representation in a video codec, which affects the appearance of a video in the media. Technically, there are various basic ways through which displays can be varied in their appearance in luminance and chrominance plates. The process of color space conversion will not be necessary for the devices or space, but it will be very crucial in customizing the visualization of the video. This will indeed be a subprocess of conversion. Typically, if the user applications in the export destination do not support the format that the video had been compressed and encrypted with, they will need to have it converted to a format that is supported by the applications available. This process will be boosted by the video codec which ensures that the video compression and decompression algorithms are considered while carrying out the conversion process. The codec is basically used in the compression process, decompressed first. These processes have to see through the rendering of the video—which is basically described as ensuring that the video can play in its destination location without any problems and that the quality is retained, especially during the decompression process. Thus, the codec is usable in processes 401, 402, and 403.

According to the illustration in FIG. 7, the conversion process is not mandatory. The video can be decoded, rendered, and played the right way. The conditions for facilitating this will include the aspect of the video being in a format that is supported by the applications in the destination. For example, if the destination computer runs on Windows, an MP4 file can be supported by the inbuilt Windows Media Player. Therefore, there will be no need for converting it. But, it will be of MOV format, there will be a need for converting the video to a format that is well supported by Windows Media Player. However, some hardware and software upgrade may be required in order to have the destinations use software that is up-to-date, which will be confirmed to support various video formats. This will save the time that may be required in converting the video, and thus help greatly in achieving the major objective of having faster video export while compared to the exporting processes that are implemented in place.

The Store & Play 404 represent the aspect of using the video after reaching the destination. At this juncture, three entities take part. The entities are the user in the receiving end, the storage, and the media player. These key players are denoted in 405, 406, and 407. The user has the most significant role to play, especially in issuing commands to the media player and projecting the video. The media player then reads the video frame and visualizes them. Upon playing the video, virtual memory, which is commonly known as the Random-Access Memory (RAM), which is illustrated in FIG. 1 under the hardware category 150 is required and is of great essence. The video will have to be loaded from the secondary storage 407 and loaded to the virtual memory in portions so as the be available for processing on a real-time basis. Again, the user needs to install large virtual memory to help in loading a video with larger quantity into it before the video is processed. The process involved here, however, has little to do with how fast the video arrives from its source to the destination. The rendering process is also not complex since it only involves reversal or rolling back the steps that will have been involved in the conversion, encryption, compression, and encoding the video. The network through which the video will have been transmitted through will be a great determinant of the speed through which the video will be transmitted with. The network setup will, therefore, create the difference.

Figure 8:
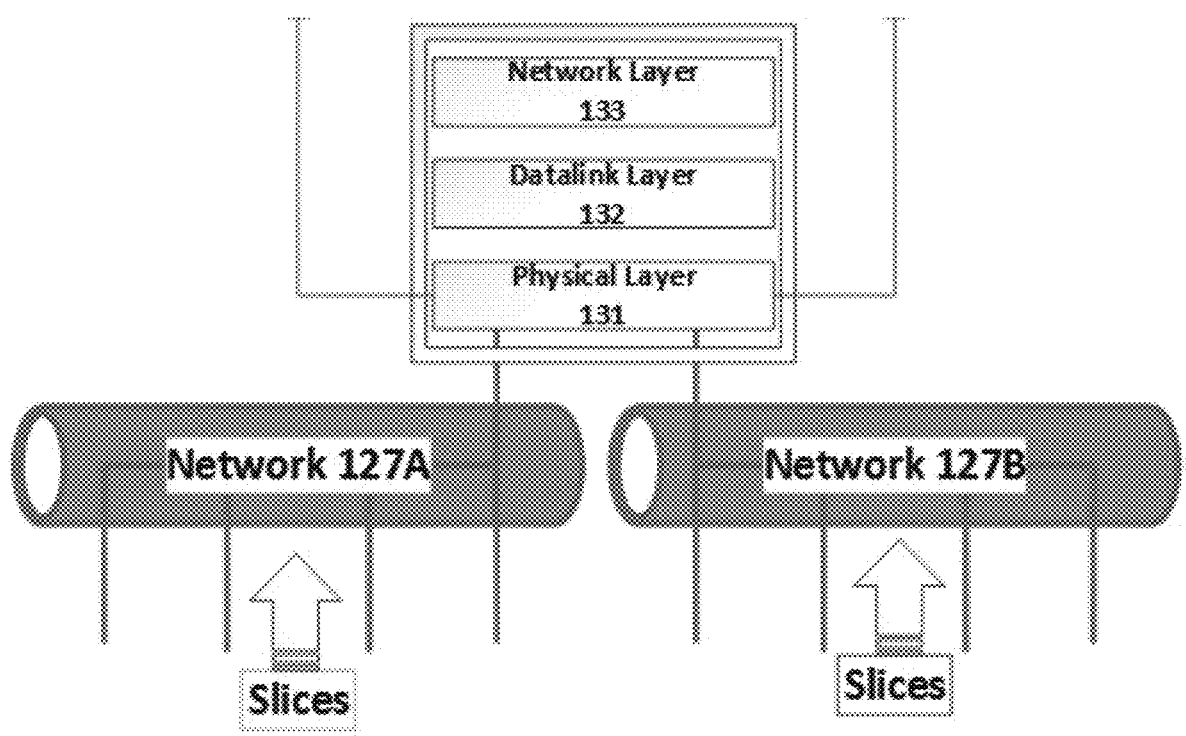
FIG. 8 shows the activities that take place in the network in facilitating fast and efficient video transmission to duo or multiple destinations.

FIG. 8: This figure illustrates the transmission process. Notably, transportation involves transmission to varying destinations which may be the local, to the cloud, or through a LAN or WAN network to another computer. The LAN or WAN transmission as well as one that the cloud—which implements the internet will have to follow the networking model for it to transmit data successfully. FIG. 8 illustrates both the TCP/IP and OSI models that may be involved in the fast transmission of the video file from the source to export destination. Some assumptions will be made at this juncture, one of them being that bandwidth optimization process will have been conducted and that there will have been conducted a thorough analysis on the network to find one that has less traffic. Other assumptions will be the fact that IPv6 IP addressing protocol will be used in place of IPv4. But, exceptions of cases where the addressing or the network setup may not support IPv6, IPv4 may be used. But, again IPv6 will be of great benefit when it comes to the provision of greater bandwidth, greater speed, better and faster transmission method, have reduced latency, supports a larger variety of addresses, and is more secure.

In looking at the transmission from a TCP/IP perspective, the user 100 interacts with the application layer, which implements various protocols such as the HTTP, FTP, SMTP, SNMP, POP3, and others. Also, other tools such as bandwidth monitors, browsers, and others will use this same application layer in performing various activities. This layer is available in both the OSI and TCP/IP model. This application will have a browser module. The browser module will be created, and its major role will be to establish and control the connection to the network. But, many operating systems basically provides network configuration properties and functionalities, which can be used by the application in establishing connections. But, apart from having the connections created. To develop a browser, the only complex part involves the integration of an engine.

The physical layer will have more to deliver as far as fast transmission will need to be achieved. The data link or the physical layer does the connecting, and therefore has to create variation whether a fast connection between the networks 127A and 127B will be fast or not. Indeed, this is the layer that received the data for transmission first. Ethernet and ARP protocols are involved in this juncture. Any physical networking devices that will need to be used will be set up in this layer. These include the transmission line, the earlier mentioned CAT6 and CAT6a cables for supporting the IEEE 802 and IEEE 802.11 networking standards. Also, in the case of modems will be required, they will be set up here. Other than Ethernet cables, there are others that can be used in the same transmission processes such as Fiber optic cables, coaxial cables, and others. But, coaxial cables are only used in transmitting analog signals and have narrow and slow bandwidth. Fiber optic cables, however, outdo Ethernet cables when it comes to the capacity of data that can be supported, the speed, noise resistance, and resistance to attenuation. But, even though fiber optic cables are way better, they cannot bend sharply since they have high chances of breaking and therefore, for computers on premises—say in the same building, ethernet cables will be the best choice. But, the 802.11n or the Wi-Fi standards can also be used in creating peer connections between computers that seek to export a video from one to another. In this layer, demultiplexing will also be done upon sending the slices. This is because the major agenda at this juncture is to create as many transmission channels as possible.

The address resolution protocol (ARP) is used in this layer to resolve any issues that may be associated with conflicting protocols. For instance, if the receiver of the export implements an IPv4 protocol standard, the ARP with work on resolving it to ensure that the network follows the IPv6 standard. In the same physical layer, the linkage between the exporter and the destination will be created. The linkage will help sender 100 in identifying the receiver and indeed knowing the details required in the network. The content set up in this layer is combined with the content set up in the next layer, which is the networking later. Other necessary functions that will be carried out in this layer include bit synchronization, error detection, and through use of the Neighbor Discovery Protocol (NDP), discover other networks that may cause noise or interfere with the efficient transmission of the video file packets through the network. Next, there is the network layer, which is also in some cases identified as the transport layer. The major functions that will be conducted in this layer will be to create packets from the signals that will have been received in the physical layer and to connect independent networks to transmit the packets to them. One crucial consideration that has to differentiate between the two layers is that in the physical layer, the connected networks will be discovered. But in the network layer, the networks to be connected to from among the discovered ones. This layer is very crucial. Through the browser, the user will be able to select the destinations through their unique identifiers—the IP address. In FIG. 8, the network layer is denoted by 133.

From the analysis of what will be required of the network layer, it is evident that the IP will be very crucial in the exportation process over a network so far since it is the address used for routing. This means there will be an interface listing the available IP addresses on the network, showing ready destinations. User 100 will then select the addresses to send the content to. The data link, as illustrated before, will be responsible for the establishment and termination of the link between the source and destination computers. It will also control the traffic of the packets being transmitted and will work on sequencing as well as acknowledgment of sending and receiving packets. Therefore, the network will allow user 100, after establishing a connection and sharing the video, to terminate the connection immediately the content reaches the destination fully. Other crucial functions that will be carried out in this layer include checking for any errors that may occur during the transmission of the packets and media access management. Therefore, this layer also enables a user to restrict connection to parties that may be prohibited from connecting. More layers may be involved as illustrated in FIG. 8 in the transmission. So far, the network layer 133, the data link layer 132, and the physical layer 131 will have helped user 100 to establish a connection, make the connection to the possible recipients or the users on the network, monitor their IP addresses and among them select the ones to export the video too. Moreover, the three layers will allow the user to select the most efficient networking hardware and software tools as well as create a network configuration, which will allow them to establish the fastest connection. The layers will also allow the user to establish and terminate connections when the need be. The videos are then exported to destinations 137 and 138. These destinations are representations of the number of destinations that the video can be exported to, which can be one or many.

What is claimed is:

1. An application for exporting video, comprising:
   means for rendering, encoding, compressing, and converting a video;
   means for encrypting the video; and
   means for replicating and transmitting the video, thereby
      generating replicas of the encoded video;
      assigning destination addresses to the replicas;
      slicing each of the replicas to create slices including the destination addresses; and
      transmitting the slices simultaneously over a network based on the destination addresses.

2. The application of claim 1, further comprising a digitization module for video conversion to different formats.

3. The application of claim 1, further comprising a module for video editing for compressing the video.

4. The application of claim 1, further comprising a video transmission module for exporting the video to various destinations.

5. The application of claim 1, further comprising a module for rendering and transcoding/encoding the video to make it playable.

6. The application of claim 1, further comprising a video compression module for reducing a size of the video.

7. The application of claim 1, further comprising a module for encrypting the video.

8. The application of claim 1, further comprising a video replication module for producing the replicas.

9. The application of claim 8, further comprising a module for slicing each of the replicas.

10. The application of claim 1, wherein the video is transferred within a computer, the video is transferred over a network to other computers, or the video is transferred over the network to a cloud.

11. The application of claim 1, further comprising means for implementing protocols for transmitting the video over a network.

12. The application of claim 1, wherein bandwidth is optimized on a transmission network.

13. A method for exporting video the method comprising:
   rendering, encoding, compressing, and converting a video;
   encrypting the video; and
   replicating and transmitting the video, comprising:
      generating replicas of the encoded video;
      assigning destination addresses to the replicas;
      slicing each of the replicas to create slices including the destination addresses; and
      transmitting the slices simultaneously over a network based on the destination addresses.

14. The application of claim 1, wherein a number of the replicas is the same as a number of destinations for the video.

15. The application of claim 1, further comprising setting a number of the slices based on a file size of the video and an available bandwidth of the network.

16. The application of claim 1, wherein each of the replicas is assigned a unique destination address among the destination addresses.

17. The application of claim 1, wherein
   the slicing of each of the replicas comprises slicing a first replica among the replicas into first slices among the slices,
   the first replica is assigned a unique destination address among the destination addresses, and
   the first slices are each assigned the unique destination address.

18. A non-transitory computer-readable medium storing instructions that, when executed by a processor, cause the processor to run the application of claim 1.

19. An apparatus for exporting video, comprising:
   one or more processors configured to:
   render, encode, compress, and convert a video;
   encrypt the video; and
   replicate and transmit the video, wherein the replication and transmission of the video comprises:
      generating replicas of the encoded video;
      assigning destination addresses to the replicas;
      slicing each of the replicas to create slices including the destination addresses; and
   transmitting the slices simultaneously over a network based on the destination addresses.

20. The application of claim 1, further comprising an interface for visualizing the application.

* * * * *